ー ー

United States Patent
Liu et al.

(10) Patent No.: US 11,665,531 B2
(45) Date of Patent: May 30, 2023

(54) END TO END TROUBLESHOOTING OF MOBILITY SERVICES

(71) Applicant: AT&T Intellectual Property I, L.P., Atlanta, GA (US)

(72) Inventors: Yu Liu, Fremont, CA (US); Baofeng Jiang, Pleasanton, CA (US); Yuhong Zheng, San Ramon, CA (US); Hyun Ok Lee, San Ramon, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 147 days.

(21) Appl. No.: 16/893,832

(22) Filed: Jun. 5, 2020

(65) Prior Publication Data

US 2021/0385646 A1    Dec. 9, 2021

(51) Int. Cl.
*H04W 8/30* (2009.01)
*G06N 20/00* (2019.01)
*H04W 28/06* (2009.01)
*H04W 24/08* (2009.01)
*H04W 8/08* (2009.01)
*H04W 28/08* (2023.01)

(52) U.S. Cl.
CPC .............. *H04W 8/30* (2013.01); *G06N 20/00* (2019.01); *H04W 8/08* (2013.01); *H04W 24/08* (2013.01); *H04W 28/06* (2013.01); *H04W 28/0967* (2020.05)

(58) Field of Classification Search
None
See application file for complete search history.

(56) References Cited

U.S. PATENT DOCUMENTS

| 10,200,884 | B2* | 2/2019 | Tan | H04W 24/02 |
| 10,321,344 | B2* | 6/2019 | Barton | H04W 24/04 |
| 10,334,456 | B2* | 6/2019 | Yang | H04L 41/16 |
| 10,425,352 | B2 | 9/2019 | Barzik et al. | |
| 10,467,040 | B2* | 11/2019 | Yousaf | H04L 43/0817 |
| 10,484,892 | B2* | 11/2019 | Bellamkonda | H04W 24/02 |
| 10,579,928 | B2* | 3/2020 | Wang | G06F 11/008 |
| 10,756,863 | B2* | 8/2020 | Nammi | H04W 72/042 |
| 10,929,278 | B2* | 2/2021 | Balasubramanian | G06N 20/00 |
| 10,932,146 | B2* | 2/2021 | Van Phan | H04W 36/0094 |
| 10,956,849 | B2* | 3/2021 | Wu | H04L 41/147 |
| 11,012,872 | B1* | 5/2021 | Bellamkonda | G06N 3/04 |
| 11,063,842 | B1* | 7/2021 | Vasseur | H04L 41/16 |
| 11,064,411 | B2* | 7/2021 | Wang | H04W 24/10 |
| 11,109,283 | B1* | 8/2021 | Kulkarni | H04W 24/02 |
| 11,146,463 | B2* | 10/2021 | Tedaldi | H04L 45/28 |
| 11,146,640 | B2* | 10/2021 | Rath | H04L 67/125 |
| 11,157,706 | B2* | 10/2021 | Ayers | G06N 3/04 |
| 11,157,780 | B2* | 10/2021 | Turco | G06F 16/288 |
| 2017/0215094 | A1* | 7/2017 | Akoum | H04W 24/08 |

(Continued)

*Primary Examiner* — Gregory B Sefcheck
(74) *Attorney, Agent, or Firm* — Guntin & Gust, PLC; Mark Wilinski (57) ABSTRACT

The end-to-end troubleshooting system may use machine learning models to predict the network quality degradation and provide resolution recommendations. The end-to-end troubleshooting system may be a self-evolving closed loop system that helps monitor the network health, provide real-time prediction of network health, and anticipate potential network outages. This intelligent system may provide recommendation resolutions based on the analysis of prediction results.

20 Claims, 7 Drawing Sheets (56) References Cited

U.S. PATENT DOCUMENTS

| | | |
|---|---|---|
| 2017/0353991 A1 | 12/2017 | Tapia |
| 2019/0361873 A1* | 11/2019 | Rogynskyy ............ H04M 15/41 |
| 2020/0107295 A1* | 4/2020 | Lee ........................ H04W 76/27 |
| 2020/0178203 A1* | 6/2020 | Lee ...................... H04W 68/005 |
| 2020/0401936 A1* | 12/2020 | Embarmannar Vijayan ................ G06F 11/3452 |
| 2021/0125148 A1* | 4/2021 | Kulkarni ................. G06N 20/00 |
| 2021/0241090 A1* | 8/2021 | Chen ..................... H04W 24/08 |
| 2021/0243623 A1* | 8/2021 | Bodiga ................. H04W 24/08 |
| 2021/0294818 A1* | 9/2021 | Savalle .................... G06N 5/04 |
| 2021/0304026 A1* | 9/2021 | Mermoud ............ G06K 9/6256 |
| 2021/0304061 A1* | 9/2021 | Kolar ....................... G06N 5/04 |
| 2022/0029892 A1* | 1/2022 | Hooli ...................... H04L 41/16 |
| 2022/0132600 A1* | 4/2022 | Kim ...................... H04W 76/30 |

* cited by examiner

END TO END TROUBLESHOOTING OF MOBILITY SERVICES

BACKGROUND

Wireless telecommunication carriers utilize key performance indicators or other types of network performance data to analyze the performance of the carrier network and mitigate identified problems. However, conventional approaches can have considerable lead-time delays that diminish customer experience and incur unnecessary capital expenditure and operating expenses.

This background information is provided to reveal information believed by the applicant to be of possible relevance. No admission is necessarily intended, nor should be construed, that any of the preceding information constitutes prior art.

SUMMARY

Methods, systems, and apparatuses, among other things, as described herein may provide for end-to-end troubleshooting of a mobility service. A method, system, computer readable storage medium, or apparatus may provide for receiving end-to-end data, the end-to-end data being associated with a network during a first period; associating the end-to-end data with one or more key performance indicators; determining that a subset of the one or more key performance indicators contributes to predicting a mobility service health; generating a prediction of the mobility service health for a second period, based on the subset of the one or more key performance indicators; determining, based on a quality of service metric, that the predicted mobility service health is indicative of a predicted service degradation for a user equipment during the second period; in response to the predicted service degradation for the user equipment during the second period, determining an indication of a root cause of the predicted service degradation for the user equipment during the second period; and proactively using an indication of the root cause of the service degradation to alter a device of the network to resolve the predicted service degradation.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION

The disclosed system may provide real-time end-to-end network performance degradation detection and may help anticipate potential outages and address network problems proactively. The end-to-end troubleshooting system may handle multiple data sources with a short end-to-end latency so that a degradation in the service quality is identified in a manner that may be imperceptible to an end user and may allow for proactive downstream mitigation actions. The end-to-end troubleshooting system may accelerate identification of root cause of network issues by dragging and dropping network performance metrics via the correlation across network data resources.

Figure 1:
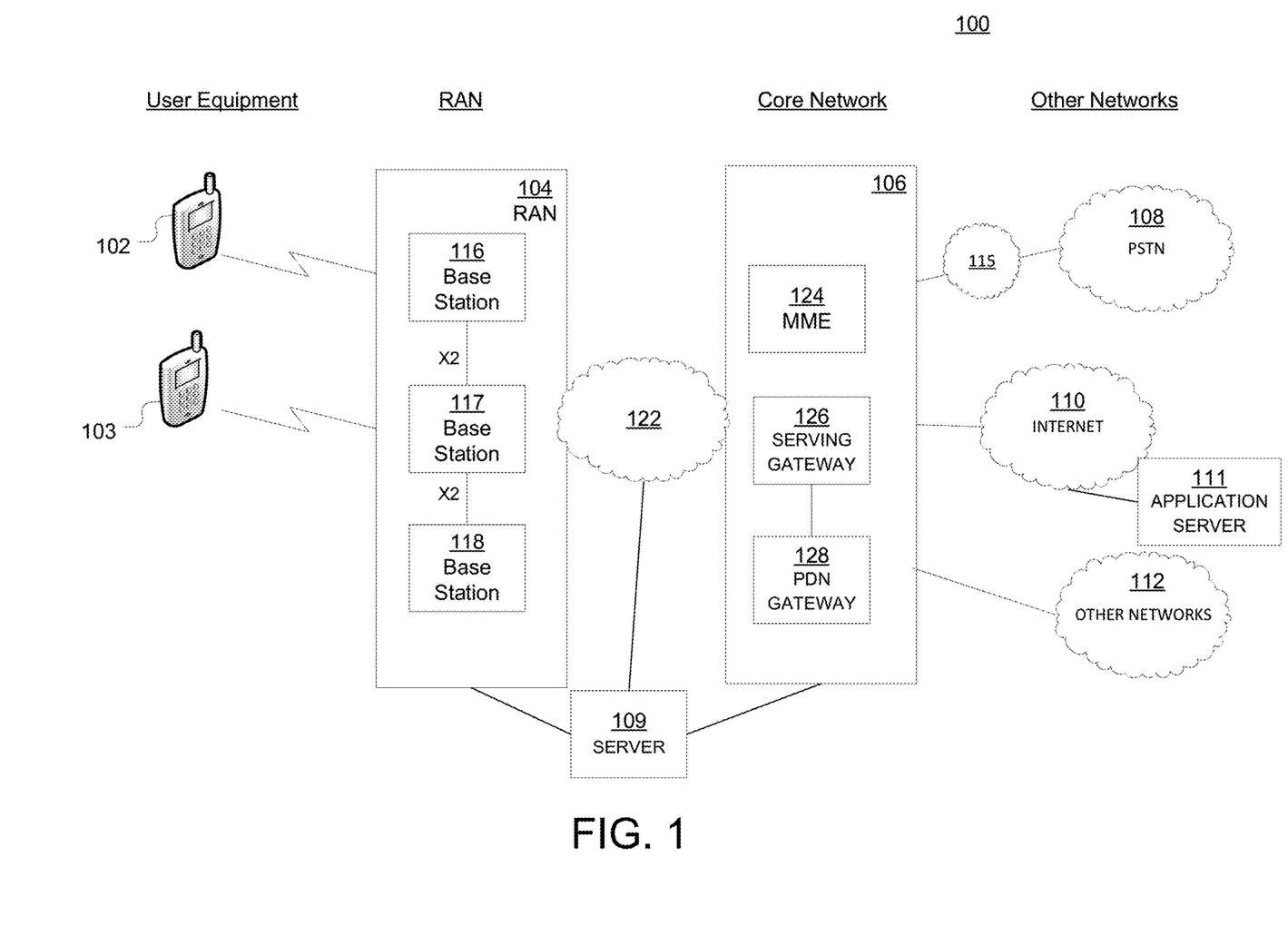
FIG. 1 illustrates an example system diagram of a radio access network and a core network.

FIG. 1 illustrates an exemplary system for end-to-end troubleshooting of a mobility service. As shown in FIG. 1, system 100 may include mobile device 102—mobile device 103 (also referred herein as user equipment), a RAN 104, a core network 106, a public switched telephone network (PSTN) 108, the Internet 110, or other networks 112. The disclosed examples contemplate any number of mobile devices, base stations, networks, or network elements. Server 109 may be communicatively connected with devices throughout system 100. As disclosed in more detail herein, server 109 may obtain and process end-to-end data in order to implement end-to-end troubleshooting of a mobility service. The end-to-end data may include data associated with mobile device 102—mobile device 103, data associated with the radio access network (RAN) 104, data associated with transport network 122 connecting RAN 104 and core network 106 elements, data associated with core network 106 (e.g., evolved packet core (EPC) for LTE), data associated with Internet 110, data associated with application server 111, or data associated with network transports throughout.

Each mobile device 102 may be any type of device configured to operate or communicate in a wireless environment. For example, a mobile device may comprise a laptop, tablet, autonomous vehicle (e.g., SAE Intl level 3 to level 5 automation), wireless sensor, or mobile phone, among other things. It is understood that the exemplary devices above may overlap in their functionality and the terms are not necessarily mutually exclusive. mobile devices 102 may be configured to transmit or receive wireless signals over an air interface 114.

System 100 may also include one or more base stations, such as base station 116—base station 118. Each of base stations 116 may be any type of device configured to wirelessly interface with mobile device 102—mobile device 103 to facilitate access to one or more communication networks, such as core network 106, PTSN 108, Internet 110, or other networks 112. By way of example, base stations 116 may be a base transceiver station (BTS), a Node-B, an eNode B, gNode B, a Home Node B, a Home eNode B, a site controller, an access point (AP), a wireless router, or the like. There may be any number of interconnected base stations or network elements.

RAN 104 may include one or more base stations 116, along with other network elements (not shown), such as a base station controller (BSC), a radio network controller (RNC), or relay nodes. One or more base stations 116 may be configured to transmit or receive wireless signals within a particular geographic region, which may be referred to as a cell (not shown).

RAN 104 may communicate with one or more of mobile devices 102 over an air interface which may be any suitable wireless communication link (e.g., RF, microwave, infrared (IR), ultraviolet (UV), or visible light). Air interface 114 may be established using any suitable radio access technology (RAT). Base station 116 may have a direct connection to Internet 110. Thus, base station 116 may not be required to access Internet 110 via core network 106.

RAN 104 may be in communication with core network 106, which may be any type of network configured to provide voice, data, applications, and/or voice over internet protocol (VoIP) services to one or more mobile devices 102. For example, core network 106 may provide call control, billing services, mobile location-based services, pre-paid calling, Internet connectivity, video distribution or high-level security functions, such as user authentication. Although not shown in FIG. 1, it will be appreciated that RAN 104 or core network 106 may be in direct or indirect communication with other RANs that employ the same RAT as RAN 104 or a different RAT.

Core network 106 shown in FIG. 1 may include a mobility management gateway or entity (MME) 124, a serving gateway 126, or a packet data network (PDN) gateway 128. While each of the foregoing elements are depicted as part of core network 106, it will be appreciated that any one of these elements may be owned or operated by an entity other than the core network operator.

MME 124 may be responsible for authenticating users of mobile devices 102, bearer activation or deactivation, selecting a particular serving gateway during an initial attach of mobile devices 102, or the like. MME 124 may also provide a control plane function for switching between RAN 104 and other RANs (not shown) that employ other radio technologies.

Serving gateway 126 may generally route or forward user data packets to or from the mobile devices 102. Serving gateway 126 may also perform other functions, such as anchoring user planes during inter-eNode B handovers, triggering paging when downlink data is available for mobile devices 102, managing or storing contexts of mobile devices 102, or the like.

Serving gateway 126 may also be connected to PDN gateway 128, which may provide mobile devices 102 with access to packet-switched networks, such as Internet 110, to facilitate communications between mobile devices 102 and IP-enabled devices.

Core network 106 may serve as a gateway for mobile devices 102 to access PSTN 108, Internet 110, or other networks 112. PSTN 108 may include circuit-switched telephone networks that provide plain old telephone service (POTS). For LTE core networks, core network 106 may use IMS core 115 to provide access to PSTN 108. Internet 110 may include a global system of interconnected computer networks or devices that use common communication protocols, such as the transmission control protocol (TCP), user datagram protocol (UDP), or IP in the TCP/IP internet protocol suite. Other networks 112 may include wired or wireless communications networks owned or operated by other service providers. For example, other networks 112 may include another core network connected to one or more RANs, which may employ the same RAT as RAN 104 or a different RAT.

Figure 2:
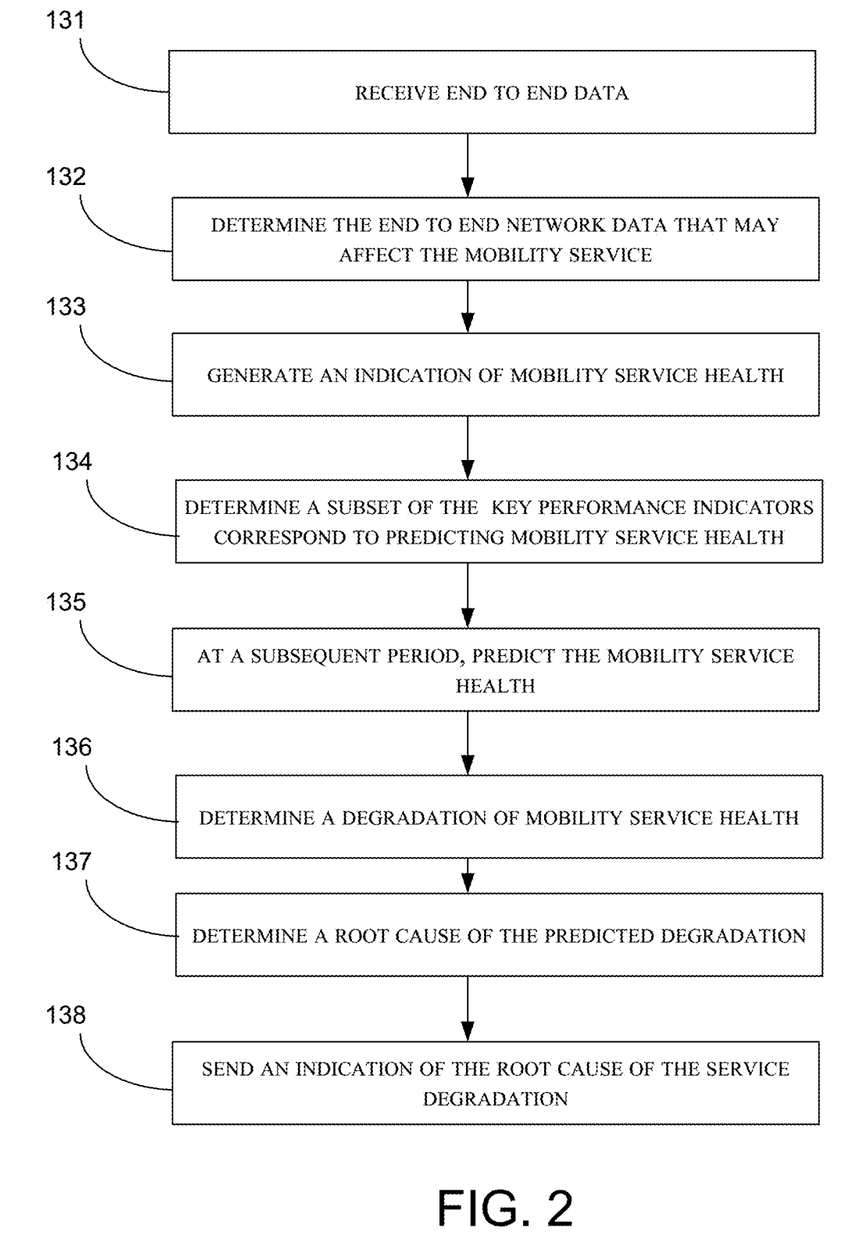
FIG. 2 illustrates an exemplary method for end-to-end troubleshooting of a mobility service.

FIG. 2 illustrates an exemplary method for end-to-end troubleshooting of a mobility service. At step 131, server 109 may receive end-to-end data from mobile device 102 and application server 111, and network devices or connections in between or in proximity to mobile device 102 and application server 111. The end-to-end data may include data associated with mobile device 102—mobile device 103, data associated with the radio access network (RAN) 104, data associated with transport network 122 connecting RAN 104 and core network 106 elements, data associated with core network 106, data associated with Internet 110, data associated with application server 111, or network transports throughout.

With continued reference to step 131, data associated with mobile device 102 may include radio frequency (RF) measurements in terms of signal strength and signal quality, performance measurements including downlink (DL) and uplink (UL) throughput and packet loss error rate, DL delay, or distance to cell tower. As mobile device 102 moves, the devices in proximity to mobile device 102 (e.g., mobile device 103) may change accordingly or stay the same during different periods. RAN 104 data associated with network elements that serve mobile device 102 may include network element wide resource consumption and load levels, such as physical resource blocks (PRBs), control channel elements (CCEs), number of concurrent connections, carried traffic volume, etc., or network element wide performance measurements including accessibility, retainability, throughput, packet loss error rate, and network element wide RF measurements including UL interference levels, DL and UL signal qualities. As mobile device 102 is moving in the network, serving network element will change accordingly, and data associated with all of the associated network elements may be captured and correlated.

With continued reference to step 131, data associated with transport network 122, or the like, may include performance metrics including round-trip delay, DL and UL packet loss error rate, etc. which may be based on active measurements where test packets are proactively transmitted and received and transport network performance metrics are computed. Data associated with the core network 106 may include packet loss rate introduced by core network elements or connections by certain devices to such core network elements. Data associated with Internet 110 or application servers 111 may include transmission control protocol (TCP) DL and UL throughput and retransmission rate and network round-trip delay, and user datagram protocol (UDP) DL and UL throughput, real-time transport protocol (RTP) packet loss rate and jitter, etc. Both the measurements that capture network-element wide performance and the measurements that capture mobile device specific traffic may be collected and correlated.

At step 132 of FIG. 2, server 109 may determine (e.g., correlate) the end-to-end network data that may affect the mobility service of mobile device 102. For a given mobile device, the network elements for the mobility service of mobile device 102, e.g., serving cell and associated base station 116 (e.g., eNodeB or gNodeB), may be identified based on control plane messages exchanged between core network elements and RAN network elements that serve mobile device 102. Then, mobile device 102 specific data such as RF measurements including Reference Signal Received Power (RSRP), Reference Signal Received Quality (RSRQ), Channel Quality Indicator (CQI), Signal to Interference plus Noise Ratio (SINR), etc. and performance measurements including throughput, packet loss error rate, delay, etc. and other info including the distance to the cell tower may be identified and correlated with RAN data for the associated RAN network element, e.g., cell, including PRB usage, CCE usage, concurrent connections, as well as network-element wide performance data capturing view for all traffic served by the same network element.

With continued reference to step 132, aggregated views for the traffic that share the same provisioning characteristics, e.g., QoS Class Identifier (QCI) and Allocation and Retention Priority (ARP), and served by the same network element may also be identified and correlated. Once serving base station 116 is identified, the associated transport network performance data may be identified and correlated. In addition, data associated with Internet 110 or application servers 111 may be identified and correlated for mobile device 102 and further correlated with the data that capture the aggregated view for the traffic served by the same associated network element. After the correlation of the multiple data sources associated with mobile device 102 and its associated network elements, a comprehensive view of the conditions and performances of mobile device 102 may be created and the associated network elements across different segments of the end-to-end service path for mobile device 102. This correlation may be performed for the associated network elements over time and space as the mobile device moves throughout the network. It is contemplated that a map or other graphical output may be created that indicates the devices connected throughout the network work that may affect the mobility service directly or indirectly.

With continued reference to step 132, in the disclosed context, correlation may refer to the process in which information elements from different data sources are combined or considered related based on certain attributes. In an example, mobile device 102 has identifiers, a temporary one X known to RAN and a permanent one Y known to core network elements. Then, X and Y are correlated based on control plane signal messages between RAN and core network elements that serve this mobile device. X and Y can then be used to identify associated network element, e.g., cell and eNodeB. Then, network data (e.g., performance metrics or identifiers) from those network elements may be correlated with mobile device specific network data. For example, based on the process disclosed above, mobile device 102 data may be correlated with other network data of the RAN network and transport network as disclosed in Table 1.

TABLE 1

| Mobile Device Data | RAN Data | Transport Data |
|---|---|---|
| Temporary ID: 123 | Cell name: A | eNodeB name: B |
| Permanent ID: abc | DL PRB usage (%): 25 | Transport DL packet loss error rate (%): 0.01 |
| Serving cell: A | UL PRB usage (%): 10 | Transport UL packet loss error rate (%): 0.001 |
| Serving eNodeB: B | CCE usage (%): 5 | Transport Round-trip delay (msec): 2 |
| Device DL RAN throughput (Mbps): 50 | Concurrent connections: 3 | |
| Device RSRP (dBm): −85 | Average DL RAN throughput per device (Mbps): 70 | |
| Device RSRQ (dB): −10 | Average UL RAN throughput per device (Mbps): 5 | |

At step 133, based on the correlation of step 132, generating an indication of mobility service health. Each key performance metric may be color-coded based on thresholds that are established to reflect the expected service quality. In a simple example, three color codes may be used: "Green", "Yellow", and "Red". "Green" indicates no expected performance issue for any application for this mobile for this measurement interval. "Yellow" indicates some performance issues for some applications during this measurement interval. "Red" indicates potential performance issues for all applications during this measurement interval. Consider DL packet loss error rate over the air. As an example, a threshold for "Green": <0.1%; thresholds for "Yellow": >=0.1% and <1%; and threshold for "Red": >=1%. For this example, when measured DL packet loss error rate over the air=0.2%, it will be rated as "Yellow", indicating some performance issues for some applications during this measurement interval. If measured value=0.01%, it will be rated as "Green."

In addition to or instead of color codes for individual performance metrics for given mobile device 102, a composite QoS metric (CQM) may be generated or assigned for each segment of the end-to-end service path, e.g., RAN, transport, application-level end-to-end, etc. to indicate the service health of respective segment. CQM may be color-coded, e.g., "Green", "Yellow", or "Red." CQM may be generated separately for the service health of mobile device 102 as well as for the service health of a network segment that serves mobile device 102. When there are multiple network elements that serve the same mobile device 102 for the same period of interest, such as during a 15-minute interval, CQMs from those network elements may be combined to indicate the overall health during the given time interval. Color-coded CQMs may provide intuitive and simple representation of the overall mobility service health of mobile device 102 and associated network elements (e.g., network elements correlated in step 132). As disclosed herein, a map or other graphic may be generated with the correlated network elements and further include CQMs, color-coded performance metrics, or the like.

With continued reference to step 133, key performance metrics may generally be pre-defined, e.g., throughput, packet loss error rate, delay, that capture user experience of mobile wireless service applications. Some key performance metrics may be application transport layer protocol specific, e.g., for TCP applications, throughput, retransmission rate, round-trip delay, for RTP applications, packet loss, jitter, etc. Also, key performance metrics may be specific to provisioning attributes, e.g., QCI and ARP.

At step 134, server 109 may determine a subset of the one or more key performance indicators correspond to predicting the mobility service health. This subset may be predetermined or trained using an artificial intelligence (AI) or machine learning (ML) model (hereinafter the term ML/AI will be used). Separate ML/AI models may be created for each of the network segments of the end-to-end service path, e.g., RAN 102 (e.g., air interface), transport network 122, or core network 106, or other networks, such as the end-to-end application level view (e.g., application server 111). For each segment, separate ML/AI models may be created to predict each key performance metrics. Then, the outputs of those ML/AI models may be combined to create the overall CQM for each segment to capture the mobility service quality for the segment. Multiple CQM may be generated for a given network element capturing different areas of network service health. For example, for RAN 104 segment, separate CQMs may be created for congestion and performance areas, respectively. The CQMs predicted for different network segments may provide intuitive and simple view of the overall service health of the mobile and associated network elements.

Figure 3:
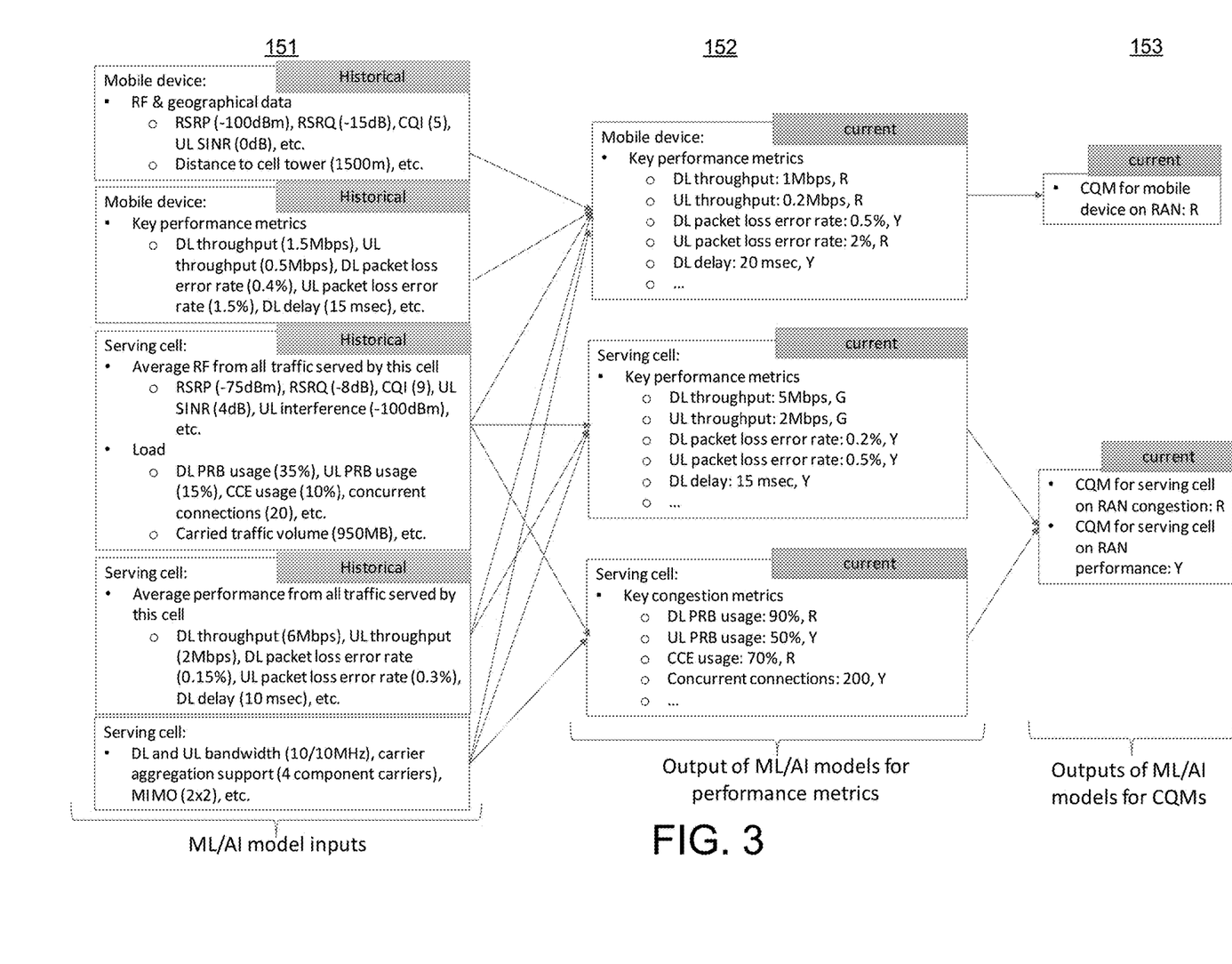
FIG. 3 illustrates exemplary input and output metrics for training ML/AI models for predicting RAN CQMs.

Consider an example for ML/AI models for RAN 104 segment CQMs, as illustrated in FIG. 3. In FIG. 3, example values are provided in parentheses for illustration purposes. As shown, ML/AI model inputs 151, input metrics from historical data to the ML/AI models are provided that capture various categories of measurements, such as: (1) the RF and geographical data of the mobile device, (2) performance of the mobile device, (3) the average RF conditions of the traffic served by the serving cell and overall load conditions at the cell, (4) the average performance of all the traffic served by the serving cell, or (5) network configurations and available features of the serving cell. As shown output 152 (i.e., output of ML/AI models for performance metrics), there is an output of ML/AI models that predict individual key performance and load metrics for various categories, such as: (1) key performance metrics of the mobile device, (2) key performance metrics of the serving cell, or (3) key load or congestion metrics of the serving cell. The input metrics based on historical measurements (e.g. input 151) may then be used to predict future values of the output metrics. For output 153 (e.g., outputs for ML/AI models for CQM), CQMs are generated based on the predicted output metrics and associated color codes for different areas of CQMs, such as: (1) overall RAN service health for the mobile device, or (2) overall RAN health for the serving network element in terms of congestion and performance. Separate ML/AI models may be created to predict metrics for different prediction horizon lengths, e.g., for next 1 minutes, 5 minutes, 15 minutes, etc.

Figure 4:
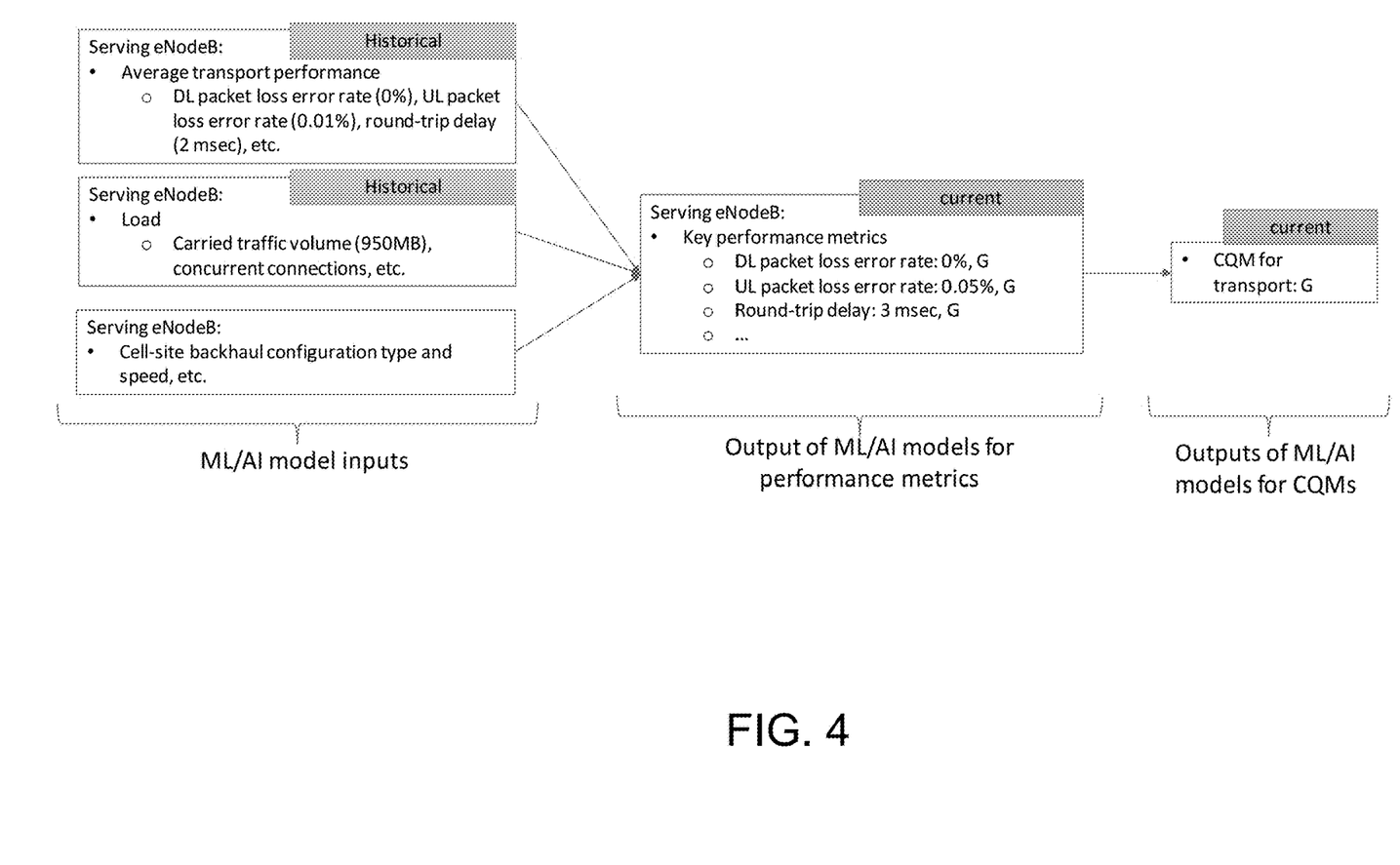
FIG. 4 illustrates exemplary input and output metrics for training ML/AI models for predicting transport network CQM.
Figure 5:
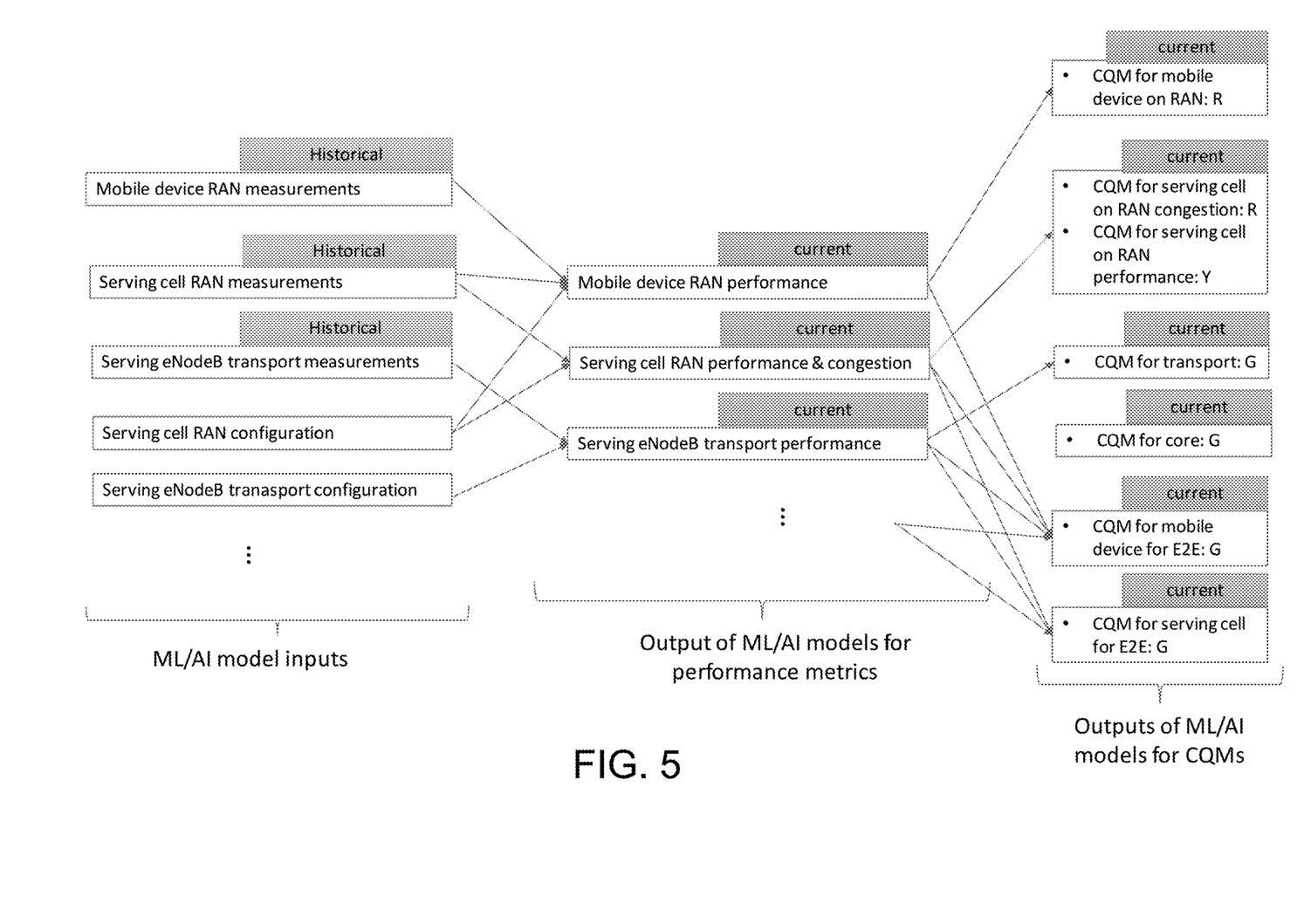
FIG. 5 illustrates exemplary training ML/AI models for predicting CQMs across network segments and end-to-end application view.

Similar process can be followed to create ML/AI models to predict CQMs for transport network, core network, or for end-to-end application level view. See FIG. 4 and FIG. 5 for example illustrations. ML/AI model selection for each performance metric (models for generating the output in the middle column such as input 151) may depend on the characteristics of the performance metric. Classical supervised learning models may be adopted for some metrics, and deep-learning models for multi-variate time-series prediction may be adopted for other metrics.

At step 135 of FIG. 2, server 109 at a subsequent period of time may predict the mobility service health for mobile device 102. The prediction may be based on a comparison of current measured key performance metrics and the key performance thresholds of step 134. For example, if a key performance metric reaches a threshold or a plurality of current key performance metrics reaches respective threshold numbers. The predicted mobility service health generated may be considered as outputs of the ML/AI models trained in step 134. At step 136, determining that a degradation of mobility service health is predicted.

At step 137 of FIG. 2, based on the predicted degradation of the mobility service health, determining a root cause of the predicted degradation for mobile device 102. The root cause may be determined by identifying instances of "Red" CQMs. Then, given the identified mobile devices with poor service quality, further review CQMs of the associated network elements across different network segments and service health areas (e.g., RAN CQMs for congestion and performance of the serving cell, transport network CQM, etc.) to identify the network segment(s) and key performance metric(s) that may be seen to cause the predicted poor service quality. For example, transport network 122 may be seen to have a predicted long round-trip delay (e.g., delay above a threshold) at the network element serving the mobile device or predicted RAN congestion (e.g., reaching a threshold percentage of bandwidth usage) may be "Red" due to high CCE in view of reaching a threshold number of concurrent connections.

At step 138 of FIG. 2, server 109 may send an indication of the root cause of the service degradation to be displayed or proactively using the indication of the root cause of the service degradation to alter a device of the network to resolve the degradation. The predicted service quality degradation and associated identified root cause(s) may be published in reports on server 109 so that other applications may access and retrieve them or may be published to a data movement platform for other application to subscribe to. Depending on the nature of the identified root cause(s), on server 109 may propose actions to mitigate the situation. For example, for predicted transport network performance issues, server 109 may check for an existing ticket handling the issue and create a ticket if none to alert and fix the problem. For predicted RAN congestion issues, on server 109 may check for an existing plan for adding capacity in the area and create a request if none to alert and alleviate the problem. For predicted RAN RF issues, e.g., high UL interference at the serving cell or weak DL coverage, on server 109 may indicate a need to adjust DL transmission power or electrical tilts of the antenna at the serving cell as well as its neighbor cells. In some cases, mitigation actions may not be available, and the predicted service quality degradation and associated root cause(s) may be used for monitoring and alerting purposes.

Further, the disclosed subject matter may allow for predicting the mobility service health based on ML/AI models first before determining the root cause(s) of the predicted service quality issue based on the used ML/AI models. Specifically, first, there may be a prediction of a mobility service health of mobile device 102 and associated network elements based on detailed ML/AI models. As part of the mobility service health prediction process, values and color codes for key performance and load metrics of mobile device 102 may be predicted, as well as associated network elements across different network segments of the end-to-end service path and for different key areas of mobility service health. As a result, for a poor (e.g., "Red") service quality predicted for mobile device 102, server 109 may provide indicators (e.g., alerts) with regard to associated network segment(s) and areas that are correlated and seen to impact the poor service quality. For example, consider a mobile device whose RAN CQM for the mobile device is predicted to be "Red." Then, server 109 checks CQMs for the associated network elements across network segments and may find RAN CQM for the congestion of the serving cell is "Red" while CQMs for other network segments are "Green." Then, the predicted poor service quality for mobile device 102 may be seen to be due to extreme congestion on the RAN at the serving cell. For the "Red" RAN CQM for mobile device 102, server 109 may check which key performance metrics were contributing to "Red" RAN CQM for mobile device 102 based on the rules and algorithms to create RAN CQM for mobility service of mobile device 102. Server 102 may also check whether the RF conditions of mobile device 102 were "poor" contributing to any identified poor key performance metric that contributed to "Red" CQM for mobile device 102, e.g., signal strength is too weak due to a long distance to the serving cell, or signal quality is too low due to high interference at the device or at the serving cell. This contribution check may be performed based on the feature importance info of the adopted ML/AI models for predicting a key performance metric or additional rules or algorithms. It is contemplated that the subject matter herein may be used in the context of some or most of the network is a virtual network. It is further contemplated that the steps and functions disclosed herein may be on one device or distributed over multiple devices.

The end-to-end troubleshooting system may help network provider reduce operational expenditure (OPEX) on identifying network performance issues and troubleshooting them. The disclosed intelligent end-to-end troubleshooting system may quickly detect, diagnose, and resolve network performance issues and avoid downtime. The end-to-end troubleshooting system may use machine learning models to predict the network quality degradation and provide resolution recommendations. The end-to-end troubleshooting system may be a self-evolving closed loop system that helps monitor the network health, provide real-time prediction of network health, and anticipate potential network outages. This intelligent system may provide recommendation resolutions based on the analysis of prediction results, which may help improve the experience of network subscribers (e.g., end users). The network quality increase based on this system may help network providers attract new subscribers and potentially increase their revenue.

Consider mobile device 103 that connects with the wireless mobility network. As soon as mobile device 103 is connected, RF and distance measurements may be collected for mobile device 103 at the serving cell. Performance metrics of the mobile device may be available and collected as well. Temporary and permanent IDs of mobile device 103 are identified and based on the info, mobile device 103 measurements are correlated with (1) measurements associated with the serving cell for capturing RF, load and performance measurements, (2) measurements associated with the serving eNodeB for capturing transport network performance, (3) measurements associated with the serving network element for capturing core network performance, or (4) end-to-end application level performance metrics associated with mobile device 103 and a serving network element. As these measurements become available to the end-to-end troubleshooting system, they may be used as input to the trained ML/AI models to predict future values of the key performance metrics of mobile device 103 and key performance and load metrics of the associated network elements and associated color-coded, and corresponding CQM values. Different ML/AI models may be trained and applied for predicting future values for different prediction horizon sizes, e.g., 1 minute, 5 minutes, 15-minutes, etc.

The system may be implemented by 4G/LTE network operators as well as future 5G network operators. The implementations may serve mobility service users including smart phones, connected cars, autonomous vehicles, VR/AR devices as well as consumer and industrial Internet of Things (IoT) devices. The system develops comprehensive signatures of service quality degradation across different network segments and employs ML/AI-based models that use comprehensive signatures to proactively identify service quality degradation with high accuracy. End-to-end: the system collects, correlates, and analyze multiple data sources from different network segments of the E2E service path, e.g., RAN congestion, RAN radio frequency (RF) issues, or cell site backhaul transport issues. This comprehensive view may allow for holistic identification of the root causes of the mobility service, rather than a particular segment of the E2E service path.

Figure 6:
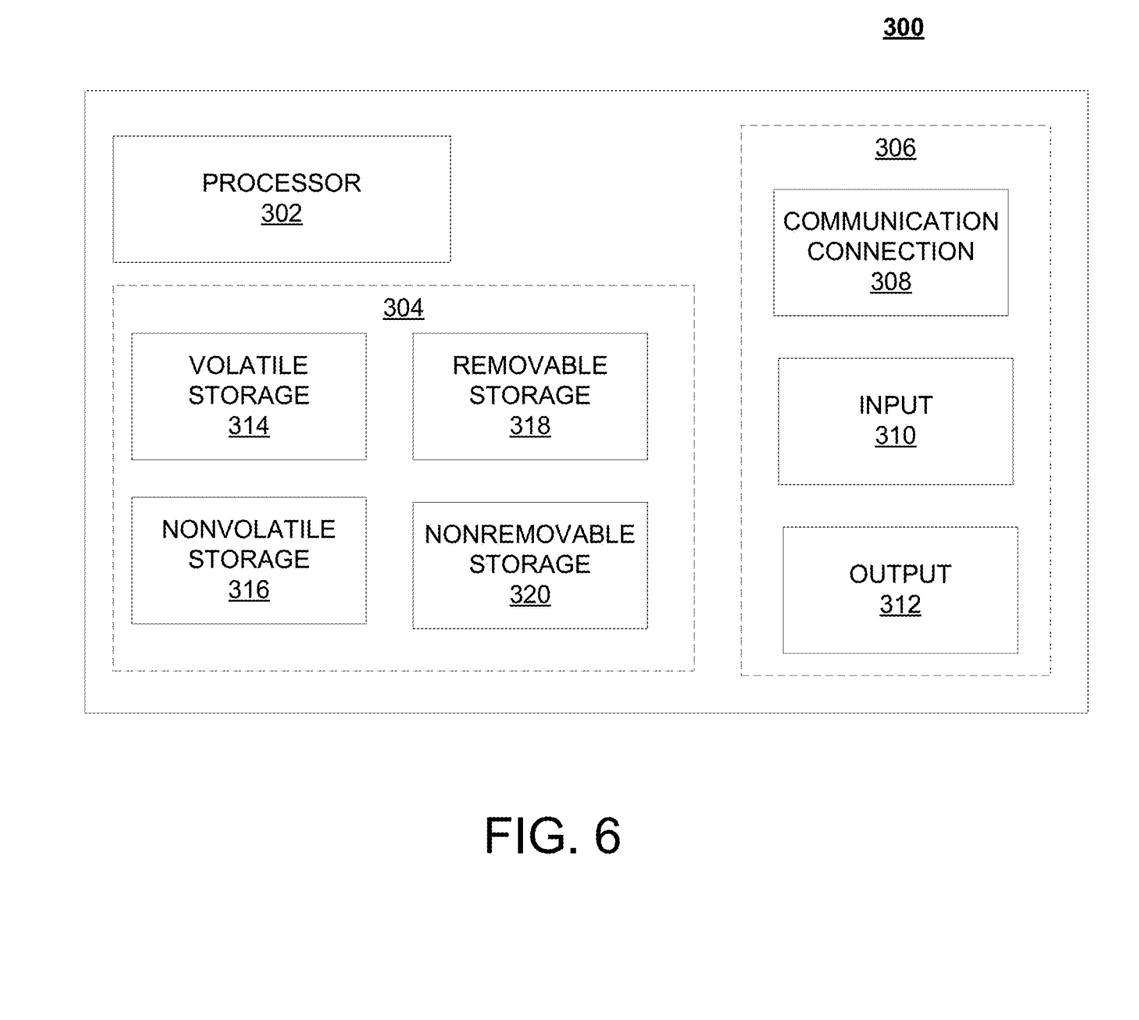
FIG. 6 illustrates a schematic of an exemplary network device.

FIG. 6 is a block diagram of network device 300 that may be connected to or comprise a component of system 100 of FIG. 1. Network device 300 may comprise hardware or a combination of hardware and software. The functionality to facilitate telecommunications via a telecommunications network may reside in one or combination of network devices 300. Network device 300 depicted in FIG. 6 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 6 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 6) to allow communications between them. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example, input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 7:
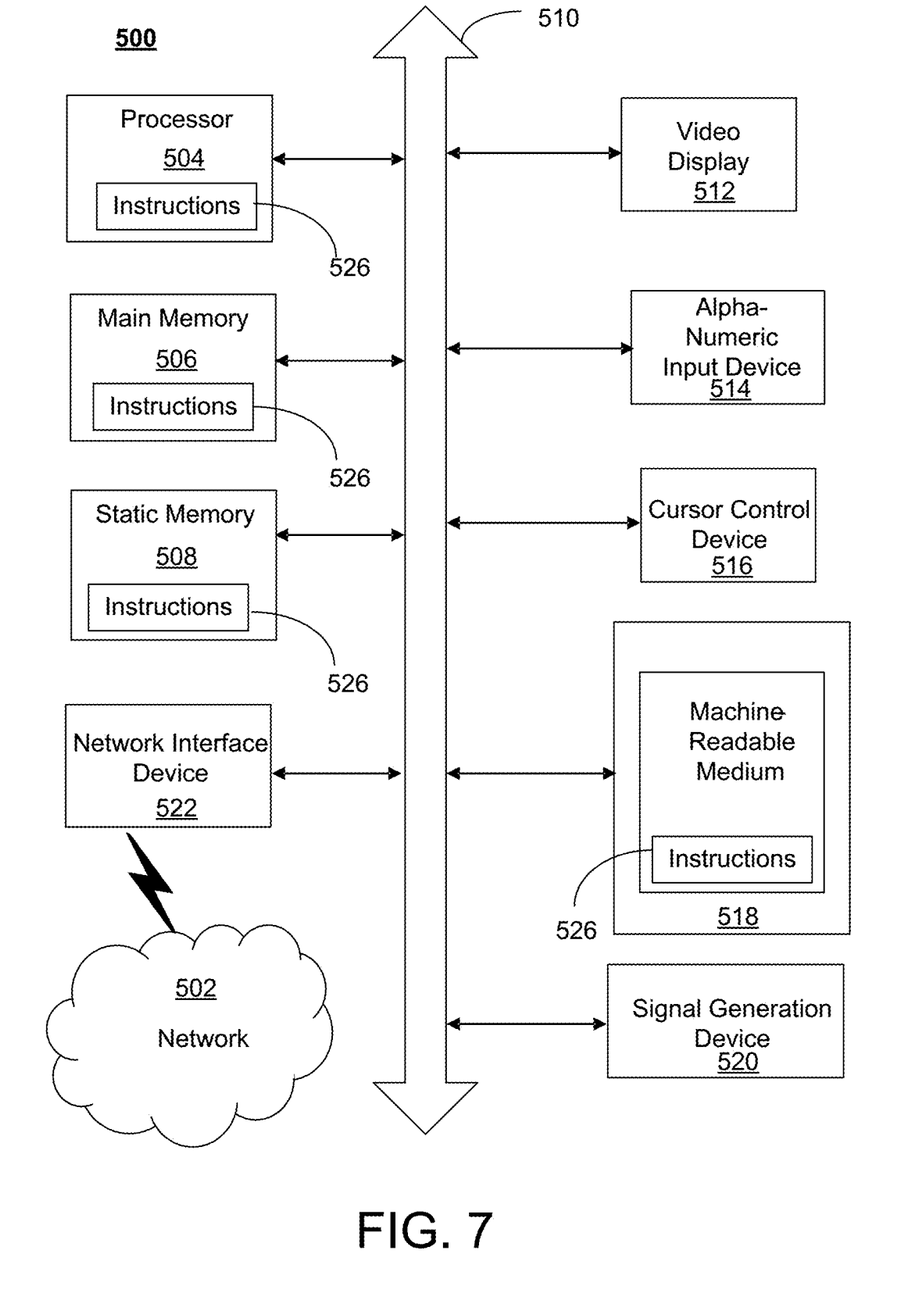
FIG. 7 illustrates an exemplary communication system that provides wireless telecommunication services over wireless communication networks.

FIG. 7 depicts an exemplary diagrammatic representation of a machine in the form of a computer system 500 within which a set of instructions, when executed, may cause the machine to perform any one or more of the methods described herein. One or more instances of the machine can operate, for example, as processor 302, base station 116—base station 118, mobile device 102—mobile device 103, MME 418, SGW 126, PDN gateway 128, or other devices of FIG. 1. In some examples, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the examples described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

As described herein, a telecommunications system wherein management and control utilizing a software defined network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a telecommunications system in which alerts for end-to-end troubleshooting of a mobility service can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine become a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine become a device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used or modifications and additions may be made to the described examples of a telecommunications system without deviating therefrom. For example, a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

In describing preferred methods, systems, or apparatuses of the subject matter of the present disclosure—end-to-end troubleshooting of a mobility service—as illustrated in the Figures, specific terminology is employed for the sake of clarity. The claimed subject matter, however, is not intended to be limited to the specific terminology so selected. In addition, the use of the word "or" is generally used inclusively unless otherwise provided herein.

This written description uses examples to enable any person skilled in the art to practice the claimed subject matter, including making and using any devices or systems and performing any incorporated methods. Other variations of the examples are contemplated herein.

Methods, systems, and apparatuses, among other things, as described herein may provide for end-to-end troubleshooting of a mobility service. A method, system, computer readable storage medium, or apparatus may provide for receiving end-to-end data, the end-to-end data being associated with a network during a first period; associating (e.g., designating) the end-to-end data with one or more key performance indicators that correspond with a section of the network; determining that a subset of the one or more key performance indicators is useful for predicting a mobility service health; generating a prediction of the mobility service health for a second period, based on the subset of the one or more key performance indicators; based on a quality of service metric, determining that the predicted mobility service health is indicative of a predicted service degradation for a user equipment during the second period; in response to the predicted service degradation for the user equipment during the second period, determining an indication of a root cause of the predicted service degradation for the user equipment during the second period; and proactively using an indication of the root cause of the service degradation to alter a device of the network to resolve the predicted service degradation. The operations may include sending the indication of the root cause of the service degradation to a display. The end-to-end data may include data associated with the user equipment, data associated with the radio access network (RAN), data associated with a transport network that connects RAN and core network elements, data associated with core network (e.g., evolved packet core (EPC) for LTE), or data associated with the Internet or application servers. The determining that the subset of the one or more key performance indicators correspond to predicting the mobility service health is trained using an artificial intelligence or machine learning model. The end-to-end data may include data associated with the user equipment, wherein the data associated with the user equipment may include radio frequency, geographical measurements, or performance measurements. The user equipment may include a smart phone, a connected car, an autonomous vehicle, a virtual reality device, augmented reality device, or Internet of Things (IoT) device. All combinations in this paragraph (including the removal or addition of steps) are contemplated in a manner that is consistent with the other portions of the detailed description.

What is claimed:

1. A method comprising:

receiving end-to-end data based on a user equipment connecting with a wireless mobility network, the end-to-end data being associated with a network that includes the wireless mobility network and the user equipment during a first period, wherein the end-to-end data associated with the user equipment comprises radio frequency measurements including signal strength and signal quality, performance measurements including downlink and uplink throughput and packet loss error rate, downlink delay, and distance to a cell tower, wherein the end-to-end data associated with the network includes data associated with a radio access network, and wherein the data associated with the radio access network pertains to: physical resource blocks, control channel elements, a number of concurrent connections, and carried traffic volume;

identifying a first, permanent identifier associated with the user equipment that is known to core network elements of a core network of the network;

identifying a second, temporary identifier associated with the user equipment that is known to the radio access network;

correlating the first identifier and the second identifier based on control plane messages between the radio access network and the core network elements;

associating the end-to-end data with one or more key performance indicators based on the correlating;

determining that a subset of the one or more key performance indicators contributes to predicting a mobility service health in accordance with a plurality of models that is operative in accordance with machine learning or artificial intelligence, wherein a first model of the plurality of models corresponds to an air interface of the radio access network, a second model of the plurality of models corresponds to a transport network of the network, a third model of the plurality of models corresponds to the core network, and a fourth model of the plurality of models corresponds to an end-to-end application view incorporating an application server;

generating a prediction of the mobility service health for a second period, based on the subset of the one or more key performance indicators;

determining, based on a quality of service metric, that the predicted mobility service health is indicative of a predicted service degradation for the user equipment during the second period;

in response to the predicted service degradation for the user equipment during the second period, determining an indication of a root cause of the predicted service degradation for the user equipment during the second period; and proactively using the indication of the root cause of the service degradation to alter a device of the network to resolve the predicted service degradation.

2. The method of claim 1, wherein the determining that the subset of the one or more key performance indicators contributes to predicting the mobility service health is based on a training of the plurality of models.

3. The method of claim 1, wherein the quality of service metric is associated with a color code.

4. The method of claim 1, wherein the end-to-end data comprises data associated with the transport network that connects the radio access network and the core network elements.

5. The method of claim 1, wherein the end-to-end data comprises data associated with application servers, the application servers including the application server.

6. The method of claim 1, wherein the user equipment includes a smart phone, a connected car, an autonomous vehicle, a virtual reality device, an augmented reality device, or an Internet of Things (IoT) device.

7. A system comprising:
one or more processors; and
memory coupled with the one or more processors, the memory storing executable instructions that when executed by the one or more processors cause the one or more processors to effectuate operations comprising:
receiving end-to-end data based on a user equipment connecting with a wireless mobility network, the end-to-end data being associated with a network that includes the wireless mobility network and the user equipment during a first period, wherein the end-to-end data associated with the user equipment comprises radio frequency measurements including signal strength and signal quality, performance measurements including downlink and uplink throughput and packet loss error rate, downlink delay, and distance to a cell tower, wherein the end-to-end data associated with the network includes data associated with a radio access network, and wherein the data associated with the radio access network pertains to: physical resource blocks, control channel elements, a number of concurrent connections, and carried traffic volume;
identifying a first, permanent identifier associated with the user equipment that is known to core network elements of a core network of the network;
identifying a second, temporary identifier associated with the user equipment that is known to the radio access network;
correlating the first identifier and the second identifier based on control plane messages between the radio access network and the core network elements;
associating the end-to-end data with one or more key performance indicators based on the correlating;
determining that a subset of the one or more key performance indicators contributes to predicting a mobility service health in accordance with a plurality of models that is operative in accordance with machine learning or artificial intelligence, wherein a first model of the plurality of models corresponds to an air interface of the radio access network, a second model of the plurality of models corresponds to a transport network of the network, a third model of the plurality of models corresponds to the core network, and a fourth model of the plurality of models corresponds to an end-to-end application view incorporating an application server;
generating a prediction of the mobility service health for a second period, based on the subset of the one or more key performance indicators;
determining, based on a quality of service metric, that the predicted mobility service health is indicative of a predicted service degradation for the user equipment during the second period;
in response to the predicted service degradation for the user equipment during the second period, determining an indication of a root cause of the predicted service degradation for the user equipment during the second period; and
proactively using the indication of the root cause of the service degradation to alter a device of the network to resolve the predicted service degradation.

8. The system of claim 7, wherein the determining that the subset of the one or more key performance indicators contributes to predicting the mobility service health is based on a training of the plurality of models.

9. The system of claim 7, wherein the quality of service metric is associated with a color code.

10. The system of claim 7, wherein the end-to-end data comprises data associated with application servers, the application servers including the application server.

11. The system of claim 7, wherein the user equipment includes a smart phone, a connected car, an autonomous vehicle, a virtual reality device, an augmented reality device, or an Internet of Things (IoT) device.

12. A tangible computer readable storage medium storing computer executable instructions that when executed by a computing device cause said computing device to effectuate operations comprising:
receiving end-to-end data based on a user equipment connecting with a wireless mobility network, the end-to-end data being associated with a network that includes the wireless mobility network and the user equipment during a first period, wherein the end-to-end data associated with the user equipment comprises radio frequency measurements including signal strength and signal quality, performance measurements including downlink and uplink throughput and packet loss error rate, downlink delay, and distance to a cell tower, wherein the end-to-end data associated with the network includes data associated with a radio access network, and wherein the data associated with the radio access network pertains to: physical resource blocks, control channel elements, a number of concurrent connections, and carried traffic volume;

identifying a first, permanent identifier associated with the user equipment that is known to core network elements of a core network of the network;

identifying a second, temporary identifier associated with the user equipment that is known to the radio access network;

correlating the first identifier and the second identifier based on control plane messages between the radio access network and the core network elements;

associating the end-to-end data with one or more key performance indicators based on the correlating;

determining that a subset of the one or more key performance indicators contributes to predicting a mobility service health in accordance with a plurality of models that is operative in accordance with machine learning or artificial intelligence, wherein a first model of the plurality of models corresponds to an air interface of the radio access network, a second model of the plurality of models corresponds to a transport network of the network, a third model of the plurality of models corresponds to the core network, and a fourth model of the plurality of models corresponds to an end-to-end application view incorporating an application server;

generating a prediction of the mobility service health for a second period, based on the subset of the one or more key performance indicators;

determining, based on a quality of service metric, that the predicted mobility service health is indicative of a predicted service degradation for the user equipment during the second period;

in response to the predicted service degradation for the user equipment during the second period, determining an indication of a root cause of the predicted service degradation for the user equipment during the second period; and proactively using the indication of the root cause of the service degradation to alter a device of the network to resolve the predicted service degradation.

13. The tangible computer readable storage medium of claim 12, wherein the determining that the subset of the one or more key performance indicators contributes to predicting the mobility service health is based on a training of the plurality of models.

14. The tangible computer readable storage medium of claim 12, wherein the end-to-end data comprises data associated with the transport network that connects the radio access network and the core network elements.

15. The tangible computer readable storage medium of claim 14, wherein the end-to-end data comprises data associated with application servers, the application servers including the application server.

16. The tangible computer readable storage medium of claim 15, wherein the data associated with the transport network comprises data associated with throughput, retransmission rate, and round-trip delay.

17. The tangible computer readable storage medium of claim 15, wherein the data associated with the radio access network comprises data associated with average radio frequency conditions of traffic served by a serving cell associated with the cell tower, load conditions at the serving cell, and available features of the serving cell.

18. The tangible computer readable storage medium of claim 12, wherein the operations further comprise:

based on the indication of the root cause of the service degradation indicating congestion in the radio access network, generating a request for adding capacity in an area; and based on the indication of the root cause of the service degradation indicating radio frequency issues including downlink coverage in an amount less than a threshold, adjusting a downlink transmission power at a serving cell associated with the cell tower, adjusting a tilt of an antenna at the serving cell, or a combination thereof.

19. The tangible computer readable storage medium of claim 12, wherein the data associated with the radio access network further pertains to:

network element wide performance measurements that include accessibility, retainability, throughput, and packet loss error rate, and, network element wide radio frequency measurements including uplink interference levels, uplink signal qualities, and downlink signal qualities.

20. The tangible computer readable storage medium of claim 12, wherein the end-to-end data associated with the network includes data associated with a second radio access network, and wherein the operations further comprise:

identifying a third, temporary identifier associated with the user equipment that is known to the second radio access network;

correlating the first identifier and the third identifier based on second control plane messages between the second radio access network and the core network elements;

associating the end-to-end data with second key performance indicators based on the correlating of the first identifier and the third identifier;

determining that a subset of the second key performance indicators contributes to predicting a second mobility service health in accordance with the plurality of models, wherein a fifth model of the plurality of models corresponds to an air interface of the second radio access network;

generating a second prediction of the second mobility service health for a third period, based on the subset of the second key performance indicators;

determining, based on the quality of service metric, that the predicted second mobility service health is indicative of a predicted service degradation for the user equipment during the third period;

in response to the predicted service degradation for the user equipment during the third period, determining an indication of a second root cause of the predicted service degradation for the user equipment during the third period; and proactively using the indication of the root cause of the service degradation for the user equipment during the third period to alter a second device of the network to resolve the predicted service degradation for the user equipment during the third period.

* * * * *